United States Patent
Stahl et al.

Patent Number: 5,991,375
Date of Patent: Nov. 23, 1999

[54] METHOD OF OPERATING A COMMUNICATIONS NETWORK AS WELL AS A COMMUNICATIONS NETWORK AND AN INTERWORKING FACILITY

[75] Inventors: Uwe Stahl, Leonberg; Wolfgang Lautenschlager, Weissach-Flacht, both of Germany

[73] Assignee: Alcatel Alsthom Compagnie Generale d'Electricite, France

[21] Appl. No.: 08/841,425

[22] Filed: Apr. 22, 1997

[30] Foreign Application Priority Data

Apr. 30, 1996 [DE] Germany ............................ 196 17 348

[51] Int. Cl.⁶ ........................................................ H04M 3/00
[52] U.S. Cl. .......................... 379/113; 370/401; 370/466
[58] Field of Search .................................... 379/113, 219, 379/220, 228, 230, 240, 207, 265, 266; 370/401, 466, 467

[56] References Cited

U.S. PATENT DOCUMENTS

| | | | |
|---|---|---|---|
| 4,775,999 | 10/1988 | Williams . | |
| 5,175,800 | 12/1992 | Galis et al. ................................ | 395/51 |
| 5,278,823 | 1/1994 | Handel .................................... | 370/249 |
| 5,490,212 | 2/1996 | Lautenschlager ........................ | 379/225 |
| 5,682,482 | 10/1997 | Burt et al. ................................ | 395/242 |

FOREIGN PATENT DOCUMENTS

| | | |
|---|---|---|
| 4324094 | 3/1994 | Germany . |
| 4417779 | 12/1995 | Germany . |

OTHER PUBLICATIONS

"Hubs for Global Services" from Trends in Telecommunications, 1992, vol. 8, No. 1, pp. 54 to 64.

Huder, Geier: D900 Mobile Communication System, System Description SYD A30808–X3231–X–2–7681, Siemens, Munchen, 1992, pp. 3–14.

Sellin, Rudiger: Management privater Telekommunikationsnetze. In: ntz, H. Jul. 1995, pp. 26–31.

Sawada, Hiroshi, et al: "Inter–Network Roaming Based on Personal Digital Cellular Standards", In: Globecom, Houston, US, BD 3, 29, Nov. 1993, pp. 1944–1949.

Voruganti, Ram Rao; "A Global Network Management Frameworlk for the '90s". In. IEEE Communications Magazine, Aug. 1994, pp. 74–83.

Rupp, Dieter, Timmermann, Uwe: "Das SISA–Transportnetz". In: telekom praxis Jul. 1995, pp. 41–54.

*Primary Examiner*—Wellington Chin
*Assistant Examiner*—Congvan Tran
*Attorney, Agent, or Firm*—Ware, Fressola, Van Der Sluys & Adolphson LLP

[57] ABSTRACT

The invention concerns a method of operating a communications network of a network operator (OPA), which is interconnected with one or more further communications networks of one or more further network operators (OPB to OPZ) via one or more gateways respectively, as well as such a communications network and an interworking facility (GATECEN) for such a communications network. For each gateway, a gateway switching center (GATE_EX) exchanges information-bearing data with a switching facility (GATE) of the respective further communications network via at least one bearer channel. Furthermore the interworking functions (STP, KDE, TAR, FUNC1 to FUNC3) are performed for all connections via the one or more bearer channel(s) which support the interconnection of the communications network via the respective gateway with the respective further communications network of the respective other network operator (OPB to OPZ). The interworking functions (STP, KDE, TAR, FUNC1 to FUNC3) for all connections of two or more spatially distributed gateway switching centers (GATE_EX) to at least one of the other communications networks (KN2 to KN3) are provided hereby in a common interworking facility (GATECEN).

18 Claims, 3 Drawing Sheets

METHOD OF OPERATING A COMMUNICATIONS NETWORK AS WELL AS A COMMUNICATIONS NETWORK AND AN INTERWORKING FACILITY

TECHNICAL FIELD

The invention concerns a method of operating a communications network of a network operator, which is interconnected with one or more further communications networks of one or more network operators through one or more gateways, wherein for each gateway, a respective gateway switching center exchanges user information with a switching facility of the respective further communications network via at least one information-carrying channel, and wherein for all connections via each information-carrying channel, interworking functions are performed which support the interconnection of the communications network with the respective further communications network of the respective other network operator through the respective gateway.

The invention also concerns a communications network of a network operator comprising a number of gateways for interconnecting the communications network with one or more communications networks of other network operators, the communications network comprising a number of gateway switching centers which are designed to exchange user information for one or more network interfaces with a switching facility of the further or one of the further communications networks via at least one information-carrying channel, and further comprising means for performing interworking functions for all connections via the information-carrying channels which support the interconnection of the communications network with the respective further communications network of the respective other network operator through the respective gateway.

The invention is further directed to an interworking facility comprising a control unit which performs interworking functions for connections via at least one information-carrying channel assigned to a gateway, the interworking functions supporting the interconnection of two communications networks of different network operators through the gateway.

BACKGROUND OF THE INVENTION

A key element for the operation of a communications network is the availability of gateways to communications networks of other network operators. Presently such gateways are principally provided by operators of national telephone networks for routing calls to other national telephone networks. It can be expected that such gateways will also be found increasingly between telephone networks of private network operators as well as between telephone networks of public network operators.

The invention starts with the presently usual provision of a gateway between two national telephone networks, such as are described for example on pages 54 to 64 of the magazine "Trends in Telecommunications", 1992, Vol. 8, No. 1.

The gateways between two national telephone networks which are operated by two different network operators always comprise two switching facilities, one of which is assigned to one of the telephone networks and the other is assigned to the other telephone network. The two switching facilities are interconnected by a bearer channel and by signalling channels assigned to the bearer channel. Interworking functions for connections via the respective bearer channel to a gateway switching center of another network operator are performed in parallel to the exchange, and to establish the connection. Such interworking functions are for example a protocol conversion for different signalling methods in both telephone networks, functions for the provision of services of the other telephone network and the acquisition of communication events for the billing between network operators. These interworking functions are integral components of the respective gateway, which make it even possible to interconnect the two telephone networks through the respective gateway.

There is a problem in that the increasing number of network operators and telecommunications services made available in a telecommunications network further increase the complexity of the gateway switching facilities.

SUMMARY OF THE INVENTION

The invention now has the task of decreasing the technical effort in a communications network containing several gateways to one or several other communications networks. This task is fulfilled by a method of operating a communications network of a network operator which is interconnected with one or more further communications networks of one or more other network operators through one or more gateways, wherein for each gateway, a respective gateway switching center exchanges user information with a switching facility of the respective further communications network via at least one information-carrying channel, and wherein for all connections via each information-carrying channel, interworking functions are performed which support the interconnection of the communications network with the respective further communications network of the respective other network operator through the respective gateway, characterized in that for all connections from two or more spatially distributed gateway switching centers to at least one of the further communications networks, the interworking functions are provided by a common interworking facility.

It is also fulfilled by a communications network of a network operator comprising a number of gateways for interconnecting the communications network with one or more communications networks of other network operators, the communications network comprising a number of gateway switching centers which are designed to exchange user information for one or more network interfaces with a switching facility of the further or one of the further communications networks via at least one information-carrying channel, and further comprising means for performing interworking functions for all connections via the information-carrying channels which support the interconnection of the communications network with the respective further communications network of the respective other network operator through the respective gateway, characterized in that two or more spatially distributed gateway switching centers are connected to a common interworking facility which is designed to provide the means for performing the interworking functions for connections from the two or more gateway switching centers to at least one of the further communications networks.

It is still further fulfilled by an interworking facility comprising a control unit which performs interworking functions for connections via at least one information-carrying channel assigned to a gateway, the interworking functions supporting the interconnection of two communications networks of different network operators through the gateway (NI), characterized in that the interworking facility is provided with an interface unit for interfacing it to two or more spatially distributed gateway switching centers, and that the control unit is designed to provide interworking functions for connections from the two or more spatially distributed gateway switching centers to one or more of the further communications networks.

The basic idea of the invention is to separate the interworking functions from the switching and the establishment of a connection through the gateway in the gateway switching center. Bearer channels for connections to other communications networks are provided in a distributed configuration on the surface of the communications network starting with the gateway switching centers, however the interworking functions for these connections are provided by a common interworking facility. This makes it possible to carry out the exchange of information-bearing data between the communications networks in accordance with the traffic requirements in a decentralized distributed configuration on the surface of the communications network, thereby achieving a favorable traffic load situation in the communications networks. In parallel thereto the interworking functions are centralized and are thereby achieved at a lower cost for hardware and software.

A further advantage results from the centralized establishment of the interworking functions which makes possible a centralized data acquisition and utilization. This avoids numerous data synchronization problems.

If signalization channels are assigned to the gateways, the central location of the interworking functions can be simply realized in that the signalling channels are connected to the switching facilities of the one or more communications network(s) of other network operators in accordance with the routing provided by the central gateway switching facility.

It is particularly advantageous to centrally provide the interworking functions for all connections to communications networks of other network operators via a single interworking facility. This creates no data synchronization problems and the interworking facility can be the base for a central billing computer for example.

BRIEF DESCRIPTION OF THE DRAWINGS

The invention is described in the following by means of a configuration example with the help of the attached drawings, wherein.

BEST MODE FOR CARRYING OUT THE INVENTION

The configuration example explains the execution of the method of the invention for operating a communications network by means of a communications network according to the invention, which has an interworking facility according to the invention.

Figure 1:
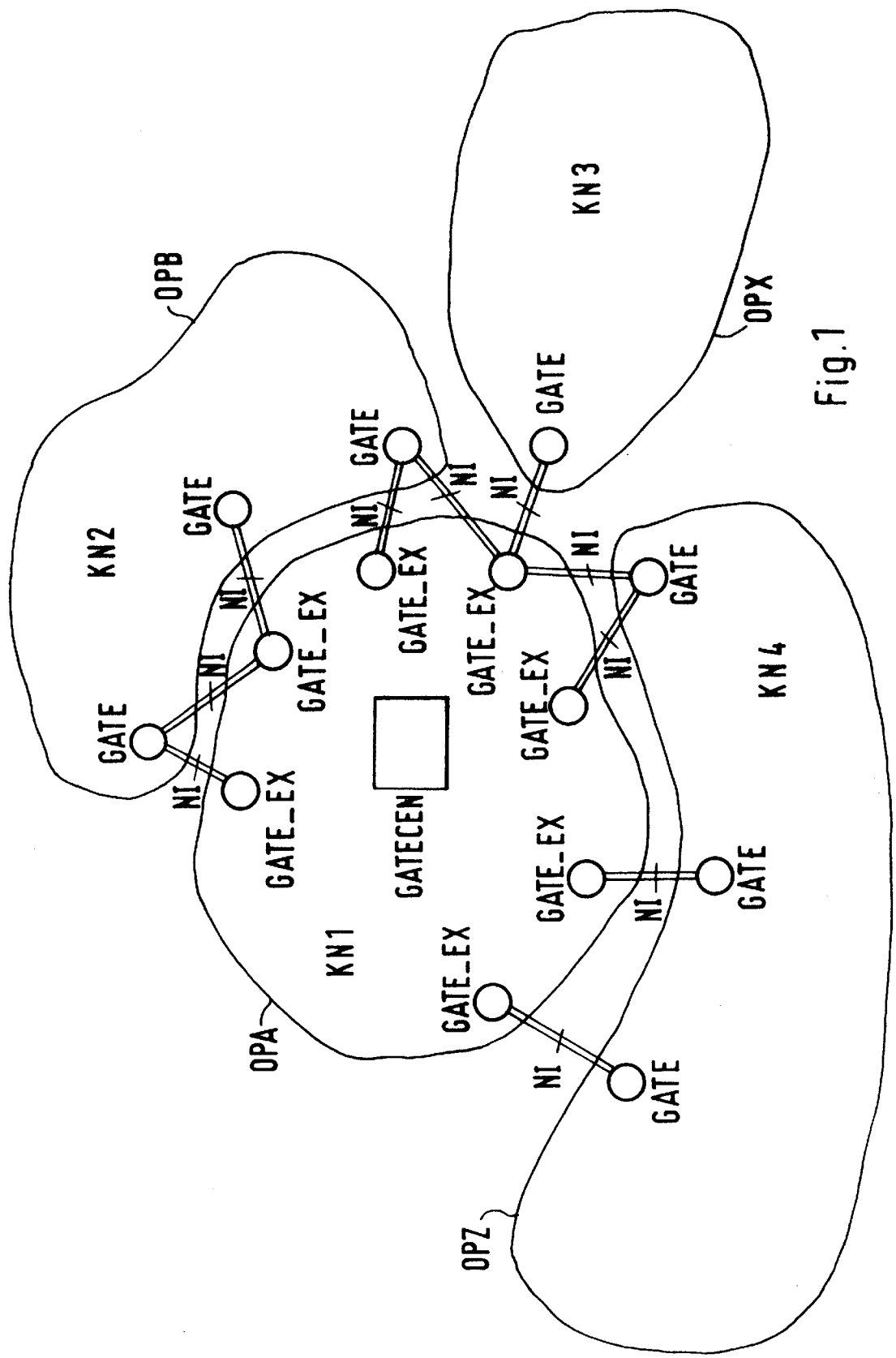
FIG. 1 is a symbolic illustration of a communications environment with a communications network according to the invention.

FIG. 1 illustrates four communications networks KN1 to KN4 which are operated by four different network operators OPA, OPB, OPX and OPZ. The communications network KN1 has several gateway switching centers GATE_EX. The communications networks KN2 to KN4 have several switching facilities GATE. The gateway switching centers GATE_EX of the communications network KN1 are connected via gateways NI to the switching facilities GATE of the communications networks KN2, KN3 and KN4. The communications network KN1 has one interworking facility GATECEN.

The communications networks KN1 to KN4 are preferably ISDN-networks (Integrated Services Digital Network). But it also is possible for the communications networks KN1 to KN4 to be other types of telephone networks or different telephone networks, particularly telephone networks using different signalling methods. In general the communications networks KN1 to KN4 can be any type of voice or data network, e.g. the communications network KN3 could be the BTX-network (interactive video text) of the German Telecom system.

The gateway switching centers GATE EX represent the usual signalling terminals for the respective communications networks KN1 to KN4. In contrast to the other signalling terminals of the respective communications networks KN1 to KN4 (not illustrated), the gateway switching centers GATE_EX are connected via at least one bearer channel to a switching facility of another communications network. In this way the gateway switching centers GATE_EX are able to switch information-bearing data from the respective communications network KN1 to KN4 to another communications network, and receive information-bearing data from outside of the communications network, and perform a first switching of these information-bearing data for the communications network KN1.

The switching facilities GATE represent nodes of the communications networks KN2 to KN4 which are responsible for inserting or taking out traffic to or from of the respective communications network. As a rule these are signalling terminals of the respective communications network which are set up analog to the gateway switching centers GATE_EX. They could however also be ROUTER or BRIDGES components.

The gateways NI between the communications network KN1 and the communications networks KN2 to KN4 are formed of bearer channels between the gateway switching centers GATE_EX of the communications network KN1 and those of the communications networks KN2 to KN4. Interworking functions for the gateways NI are performed on both the communications network KN1 side as well as on the other communications networks KN2 to KN4 side, thus enabling the interconnection of these communications networks which are assigned to different network operators. The interworking functions for all connections via the gateways NI in the communications network KN1 are centrally provided by the interworking facility GATECEN.

But it is also possible to centrally provide the interworking functions in the gateway switching facility only for a selection of connections, for example for all the connections to a predetermined one of the communications networks KN2 to KN4. The following describes in detail the availability of the gateways between the communications network KN1 and the communications networks KN2 to KN4 by means of FIG. 2.

Figure 2:
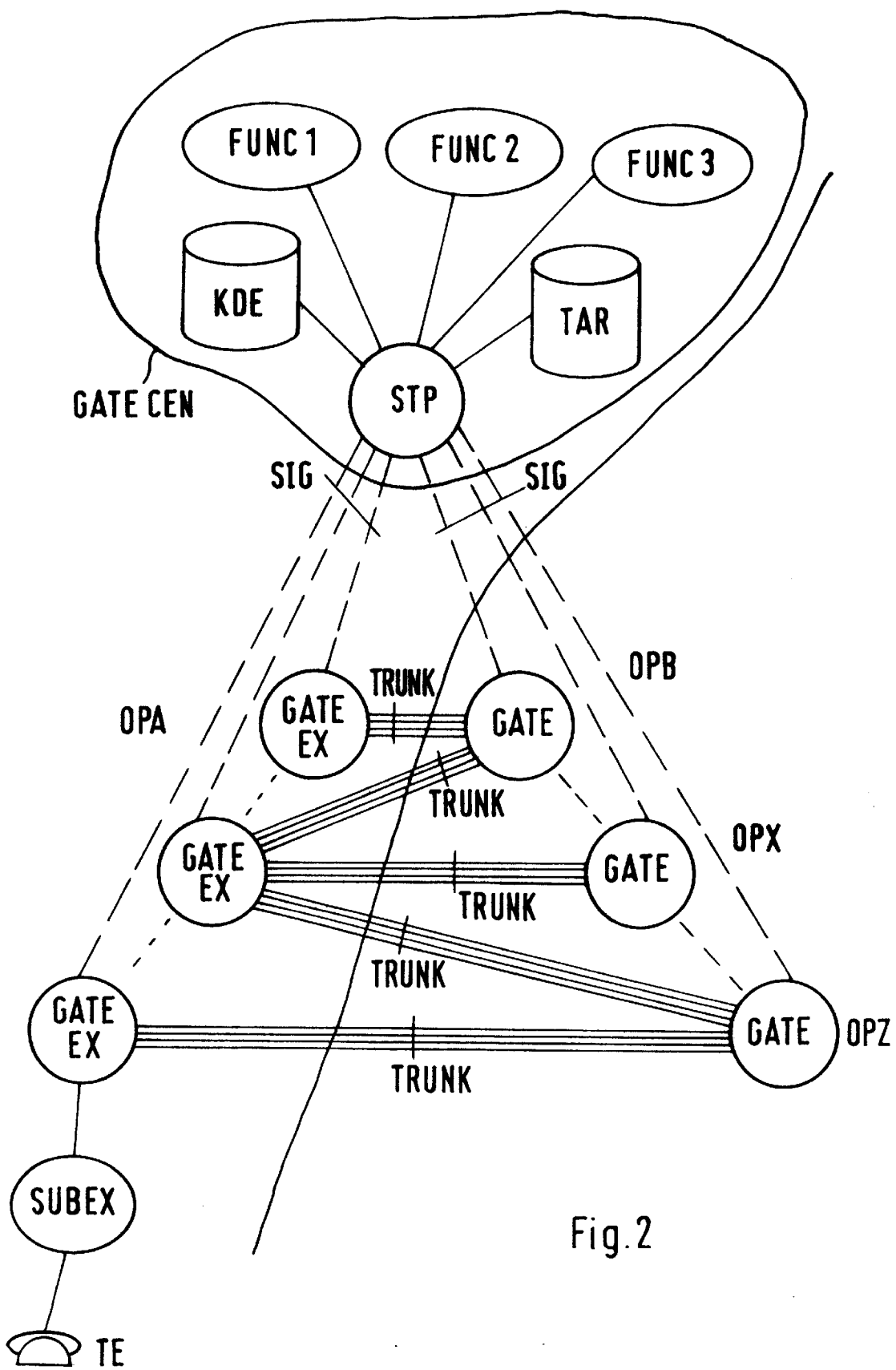
FIG. 2 is a detailed illustration of a section of the communications environment in FIG. 1.

FIG. 2 illustrates three of the gateway switching centers GATE_EX, the interworking facility GATECEN, a subscriber switching center SUBEX and a terminal TE. Three gateway switching centers GATE_EX are assigned to the communications network KN1 and thereby to the network operator OPA. One gateway switching center GATE_EX each is assigned to the communications networks KN2, KN3 or KN4 and thereby to the network operator OPB, OPX or OPZ. The gateway switching centers GATE_EX of network operator OPA are connected to the switching facilities GATE of network operators OPB, OPX or OPZ via the group of bearer channels TRUNK. The gateway switching centers GATE_EX and the switching facilities GATE are connected to the interworking facility GATECEN of network operator OPA via the signalling channels SIG. The subscriber switching center SUBEX connects the terminal TE to a gateway switching center GATE_EX of network operator OPA.

Each of the groups of bearer channels TRUNK contains a number of PCM (pulse-code modulation) lines which connect one or more ISDN primary rate accesses of gateway switching center GATE_EX to the respective switching facility GATE. The group of bearer channels TRUNK only carries the bearer channels for these connections. The signalling channels SIG, which transport the signals for the connections provided via the bearer channels, are connected to the interworking facility GATECEN by means of lines. In this way the signalling channels are separated from the bearer channel assigned to them and are routed to the central interworking facility GATECEN. By means of the data conducted in the signalling channels SIG, the interworking facility GATECEN then performs the interworking functions for all the connections routed to the other communications networks via the gateway switching centers GATE_EX of the communications network KN1.

The number of bearer channels in the group of bearer channels TRUNK can vary from one to many channels and is not tied to a multiple of the number of bearer channels in a primary rate access.

The interworking facility GATECEN contains six functional units STP, KDE, TAR, FUNC1, FUNC2 and FUNC3. The functional unit STP provides the interface and the protocol stack for the signalling channels SIG connected to the interworking facility GATECEN. In this case the exchange of information via these signalling channels corresponds to the No. 7 signalling system, so that the existing No. 7 STP functions and interfaces can be used to implement the functional unit STP.

To provide the interworking functions it is sufficient in this case to tie-in the interworking facility GATECEN in a pure signalling fashion, so that no additional connection elements are required for the bearer channels to the interworking facility GATECEN.

In this case the interworking facility GATECEN performs no line switching functions of any kind by itself.

The functional units KDE to FUNC3 perform the interworking functions in the more precise sense. The functional unit STP makes the necessary data and access possibilities available in order to provide the interworking functions centrally for all the connections that link the gateway switching centers GATE_EX to the functional unit STP via the signalling channels.

The functional unit KDE acquires all the relevant data for the connection such as source call number, target call number, clock time, date as the basis for computing the charges to the network operators, and stores them in a central data bank.

The functional unit TAR provides an indication of the charge to the subscribers of the communications network KN1 who initiate the establishment of a connection to a subscriber of one of the other communications networks KN2 to KN4. To that end the functional unit TAR has a tariff data bank which contains the applicable charge information for the gateways NI of the communications network KN1 to the other communications networks KN2 to KN4. By means of this data bank the functional unit TAR creates charge parameters which it transmits via the corresponding signalling channel SIG and the gateway switching center GATE_EX to the calling subscriber's switching center. The latter then applies the charge for example by sending charge pulses via the subscriber line to the calling subscriber's terminal.

The functional unit FUNC1 performs functions which enable the signalling interconnection of the gateway switching center GATE_EX to the switching facility GATE of the other communications networks KN2 to KN4. It then performs central monitoring and protection functions for the interconnection of the respective signalling channels. Different network operators can also put different ISUP (Integrated Service User Part) variations in operation. In that case the functional unit FUNC1 performs a central conversion for these different signalling variations. It further checks the signalling for admissibility with respect to the agreement between the network operator OPA and the network operators OPB to OPZ. It checks for example whether the connected line identification (CLE) according to the No. 7 signalling system is not routed further to the communications network, or at least not when suppressed.

The functional unit FUNC3 performs monitoring, protection and conversion functions with reference to the telecommunications services provided by the communications networks KN1 to KN4. To that effect it checks the ISDN signalling for reliability with respect to the agreements between the network operators OPA to OPZ regarding the telecommunications services. For example if it has been agreed to block service access numbers from unrelated networks, the functional unit FUNC3 blocks the establishment of the connection from one of the other communications networks KN2 to KN4 to a service access number of communications network KN1, by transmitting corresponding signalling information via the pertinent signalling channel in response to the request for a connection.

If access to telecommunications services of another communications network is possible in accordance with an agreement, it may become necessary for the functional unit FUNC3 to perform a conversion of the service access number by changing the signalling messages from one of the other communications networks KN2 to KN4 accordingly before it is routed to the corresponding gateway switching center.

In this case the functions of functional unit FUNC3 can not only be provided on the basis of call numbers, but also on the parameter and procedure plane. In particular this makes the monitoring, protection and conversion of ISDN services possible.

It is also possible for the interworking facility GATECEN to provide further interworking functions in common for several gateway switching centers GATE_EX which support the interconnection of the communications networks of different network operators.

It is also possible that the signalling channels assigned to the group of bearer channels TRUNK are not conducted via the interworking facility GATECEN. In that case the functional unit STP would have to be integrated into the individual gateway switching centers GATE_EX of the communications network KN1, and the interworking facility GATECEN would then communicate with these integrated functional units via data links. However this would entail the disadvantage that the functional units corresponding to the functional unit STP would have to be integrated into the gateway switching centers GATE_EX of the communications network KN1.

It is also possible for the connection between the gateway switching centers GATE_EX and the switching facilities GATE of the other communications networks KN2 to KN4 to be routed via one or more bearer channels to which no signalling channel is assigned. In that case the signalling could take place for example within the bearer channel (in-band). It is then also necessary to integrate the functions corresponding to the functional unit STP into the gateway switching centers GATE_EX of the communications network KN1, and to connect them to the central interworking facility GATECEN via a data link.

Figure 3:
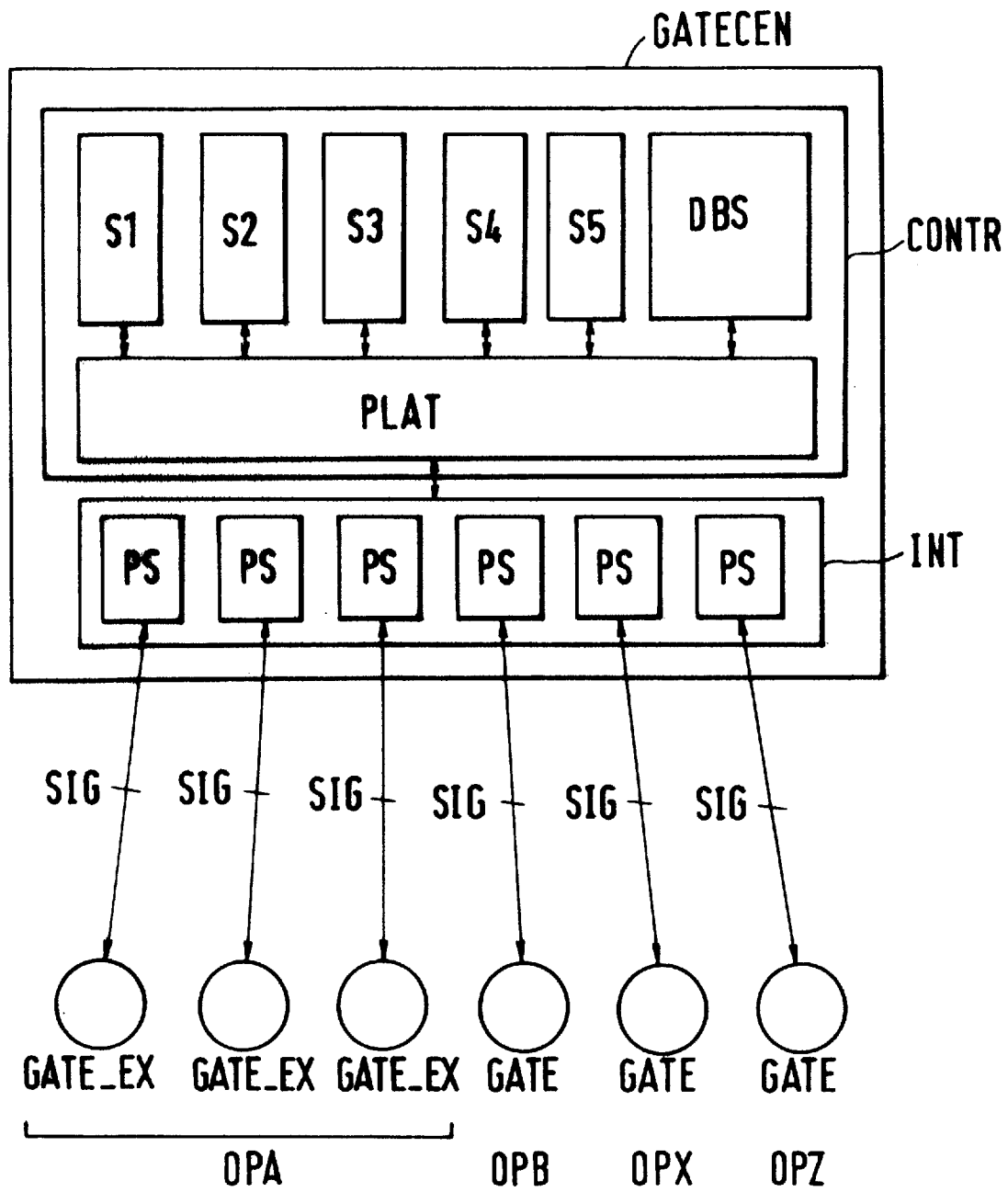
FIG. 3 is a block diagram of an interworking facility according to the invention for the communications network according to the invention.

A possible configuration of the interworking facility GATECEN is now explained by means of FIG. 3. FIG. 3 illustrates the interworking facility GATECEN which communicates via signalling channels SIG with the gateway switching centers GATE_EX of network operator OPA and the switching facilities of network operators OPB to OPZ. The interworking facility GATECEN comprises an interface unit INT and a controller CONTR.

The interface unit INT contains the functional hardware blocks which enable the connection of the signalling channels SIG. In addition it performs the function PS for each one of the signalling channels SIG, which includes the processing of the protocol stack that corresponds to the signalling system No. 7.

The controller CONTR comprises a central hardware and software platform PLAT and several applications S1 to S5 and DBS which operate on this platform and are controlled thereby. As the server of a client-server architecture, the applications S1 to S5 perform the functions of functional units KDE, PAR and FUNC1 to FUNC3. The application DBS represents a data bank system which supports applications S1 to S5 and central functions of the platform PLAT when it performs the respective functions. By interconnecting the applications S1 to DBS via the central platform PLAT it becomes possible to provide central interworking functions in common for a number of gateway switching centers.

What is claimed is:

1. A method of operating a communications network (KN1) of a network operator (OPA) which is interconnected with one or more further communications networks (KN2 to KN4) of one or more other network operators (OPB to OPZ) through one or more gateways (NI), wherein for each gateway (NI), a respective gateway switching center (GATE_EX) exchanges user information with a switching facility (GATE) of the respective further communications network (KN2 to KN4) via at least one information-carrying channel, and wherein for all connections via each information carrying channel, interworking functions (STP, KDE, TAR, FUNC1 to FUNC3) are performed which support the interconnection of the communications network with the respective further communications network (KN2 to KN4) of the respective other network operator (OPB to OPZ) through the respective gateway (NI), said interworking functions including protocol conversion for different signaling methods or provision of services of a communications network (KN1 to KN4), or acquisition of communications events for billing between the communications network (KN1) and the one or more further communications networks (KN2 to KN4), characterized in that for all connections from two or more spatially distributed gateway switching centers (GATE_EX) to at least one of the further communications networks (KN2 to KN3), the interworking functions (STP, KDE, TAR, FUNC1 to FUNC3) are provided by a common interworking facility (GATECEN).

2. A method as claimed in claim 1, characterized in that for each gateway (NI), the information-carrying channel or all information-carrying channels form a group of information-carrying channels (TRUNK) which is assigned at least one signaling channel (SIG) between the respective gateway switching center (GATE_EX) and the respective further communications network (KN1 to KN3).

3. A method as claimed in claim 2, characterized in that the signaling takes place in accordance with the signaling system No. 7 via each signaling channel (SIG).

4. A method as claimed in claim 3, characterized in that each signaling channel (SIG) between the spatially distributed gateway switching centers (GATE_EX) and each further communications network (KN2 to KN3) is routed through the common interworking facility (GATECEN), and that the interworking functions (STP, KDE, TAR, FUNC1 TO FUNC3) for the respective connections are performed by processing data transmitted over said signaling channel (SIG).

5. A method as claimed in claim 4, characterized in that the interworking facility (GATECEN) centrally registers the communications data required for billing with other network operators (OPB to OPZ).

6. A method as claimed in claim 5, characterized in that the interworking facility (GATECEN) centrally performs conversion and monitoring of the signaling between communications networks (KN1 to KN4) of different network operators (OPA to OPZ).

7. A method as claimed in claim 6, characterized in that the interworking facility (GATECEN) centrally controls and adapts the access to telecommunications services of the communications network (KN1) from one or more of the further communications networks (KN1 to KN3).

8. A method as claimed in claim 7, characterized in that the interworking facility (GATECEN) centrally provides the interworking functions (STP, KDE, TAR, FUNC1 to FUNC3) for all connections to the further communications networks (KN2 to KN3).

9. A method as claimed in claim 8, characterized in that the interworking facility centrally provides the interworking functions for all connections to at least one of the further communications networks (KN2 to KN4) for both the network operator and each other network operator.

10. A method as claimed in claim 9, characterized in that the interworking facility is managed by a third party.

11. A communications network (KN1) of a network operator (OPA) comprising a number of gateways (NI) for interconnecting the communications network (KN1) with one or more communications networks (KN2 to KN4) of other network operators (OPB to OPZ), said communications network (KN1) comprising a number of gateway switching centers (GATE_EX) which are designed to exchange user information for one or more network interfaces (NI) with a switching facility (GATE) of the further or one of the further communications networks (KN2 to KN4) via at least one information-carrying channel, and further comprising means for performing interworking functions (STP, KDE, TAR, FUNC1 to FUNC3) for all connections via the information-carrying channels which support the interconnection of the communications network (KN1) with the respective further communications network (KN2 to KN4) of the respective other network operator (OPB to OPZ) through the respective gateway (NI), characterized in that two or more spatially distributed gateway switching centers (GATE_EX) are connected to a common interworking facility (GATECEN) which is designed to provide the means for performing the interworking functions (STP, KDE, TAR, FUNC1 to FUNC3) for connections from said two or more gateway switching centers (GATE_EX) to at least one of the further communications networks (KN2 to KN4), said interworking functions including protocol conversion for different signaling methods or provision of services of a communications network (KN1 to KN4), or acquisition of communications events for billing between the communications network (KN1) and the one or more further communications networks (KN2 to KN4).

12. An interworking facility (GATECEN) comprising a control unit (CONTR) which performs interworking functions (STP, KDE, TAR, FUNC1 to FUNC3) for connections via at least one information carrying channel assigned to a gateway (NI), said interworking functions supporting the interconnection of two communications networks (KN1; KN2 to KN4) of different network operators (OPA; OPB to OPZ) through the gateway (NI), characterized in that the interworking facility (GATECEN) is provided with an interface unit (INT) for interfacing it to two or more spatially distributed gateway switching centers (GATE_EX), and that the control unit (CONTR) is designed to provide interworking functions (STP, KDE, TAR, FUNC1 to FUNC3) for connections from the two or more spatially distributed gateway switching centers (GATE_EX) to one or more of the further communications networks (KN2 to KN4), said interworking functions including protocol conversion for different signaling methods or provision of services of a communications network (KN1 to KN4), or acquisition of communications events for billing between the communications network (KN1) and the one or more further communications networks (KN2 to KN4).

13. A method as claimed in claim 2, characterized in that each signaling channel (SIG) between the spatially distributed gateway switching centers (GATE_EX) and each further communications network (KN2 to KN3) is routed through the common interworking facility (GATECEN), and that the interworking functions (STP, KDE, TAR, FUNC1 TO FUNC3) for the respective connections are performed by processing data transmitted over said signaling channels (SIG).

14. A method as claimed in claim 1, characterized in that the interworking facility (GATECEN) centrally registers the communications data required for billing with other network operators (OPB to OPZ).

15. A method as claimed in claim 1, characterized in that the interworking facility (GATECEN) centrally performs conversion and monitoring of the signaling between communications networks (KN1 to KN4) of different network operators (OPA to OPZ).

16. A method as claimed in claim 1, characterized in that the interworking facility (GATECEN) centrally controls and adapts the access to telecommunications services of the communications network (KN1) from one or more of the further communications networks (KN1 to KN3).

17. A method as claimed in claim 1, characterized in that the interworking facility (GATECEN) centrally provides the interworking functions (STP, KDE, TAR, FUNC1 to FUNC3) for all connections to the further communications networks (KN2 to KN3).

18. A method as claimed in claim 1, characterized in that the interworking facility centrally provides the interworking functions for all connections to at least one of the further communications networks (KN2 to KN4) for both the network operator and each other network operator.

* * * * *